(12) United States Patent
Jacobson et al.

(10) Patent No.: US 9,661,024 B2
(45) Date of Patent: *May 23, 2017

(54) CONFIGURING APPLICATIONS AND POLICIES IN NON-COOPERATIVE ENVIRONMENTS

(71) Applicant: Microsoft Corporation, Redmond, WA (US)

(72) Inventors: Neil A. Jacobson, Acton, MA (US); Shruthi Achutha, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,580

(22) Filed: Dec. 12, 2013

(65) Prior Publication Data
US 2015/0172316 A1    Jun. 18, 2015

(51) Int. Cl.
*H04L 29/06* (2006.01)
*G06F 21/53* (2013.01)
*G06F 21/54* (2013.01)

(52) U.S. Cl.
CPC .............. *H04L 63/20* (2013.01); *G06F 21/53* (2013.01); *G06F 21/54* (2013.01)

(58) Field of Classification Search
CPC ...... H04W 12/08; H04W 12/06; H04L 63/20; H04L 63/08; G06F 21/53; G06F 21/54
(Continued)

(56) References Cited

U.S. PATENT DOCUMENTS 5,974,549 A    10/1999 Golan
8,468,595 B1    6/2013 Huang et al.
(Continued)

FOREIGN PATENT DOCUMENTS

WO    2013103959 A2    7/2013

OTHER PUBLICATIONS

Anand Kale, "Mobile Application Management", Retrieved on: Oct. 21, 2013, Available at: http://www.wipro.com/documents/mobile-application-management.pdf.
(Continued)

*Primary Examiner* — Mahfuzur Rahman
*Assistant Examiner* — Narciso Victoria
(74) *Attorney, Agent, or Firm* — Dodd Law Group; Michael B. Dodd

(57) ABSTRACT

The present invention extends to methods, systems, and computer program products for configuring applications and policies in non-cooperative environments. Embodiments of the invention provide the ability to configure non-cooperative applications and operating systems to comply with a policy. For example, applications and operating systems at a user's (e.g., an information worker's) personal device (e.g., smartphone) can be appropriately configured to provide more secure access to a corporate IT infrastructure. An IT worker can programmatically repackage an application to comply with a policy, deploy it to a user's personal device, and adjust the application's behavior during execution to comply with the policy. Adjusted behavior can include injecting custom user interfaces into an application to support various scenarios. Injecting a custom user interface can be facilitated by tracking visual context for an application across one or more displays and switching between the application's visual context and the custom user interface.

22 Claims, 12 Drawing Sheets

(58) Field of Classification Search
USPC .......................................................... 726/1
See application file for complete search history.

(56) References Cited

U.S. PATENT DOCUMENTS

| | | | |
|---|---|---|---|
| 8,869,235 B2* | 10/2014 | Qureshi et al. .................. 726/1 |
| 9,043,480 B2* | 5/2015 | Barton et al. ................. 709/229 |
| 2006/0288420 A1 | 12/2006 | Mantripragada et al. |
| 2007/0157203 A1 | 7/2007 | Lim |
| 2012/0072509 A1 | 3/2012 | Booth |
| 2012/0260217 A1 | 10/2012 | Celebisoy |
| 2013/0091543 A1 | 4/2013 | Wade et al. |
| 2013/0091557 A1 | 4/2013 | Gurrapu |
| 2013/0130653 A1 | 5/2013 | Deasy et al. |
| 2013/0227561 A1 | 8/2013 | Walsh et al. |
| 2013/0263212 A1 | 10/2013 | Faltyn et al. |
| 2014/0040979 A1 | 2/2014 | Barton |
| 2014/0059573 A1* | 2/2014 | Jawa et al. .................... 719/331 |
| 2014/0081508 A1 | 3/2014 | Lida et al. |
| 2014/0130119 A1 | 5/2014 | Goldschlag |
| 2014/0181896 A1 | 6/2014 | Yablokov |
| 2014/0298403 A1 | 10/2014 | Qureshi |
| 2015/0026773 A1 | 1/2015 | Dunphey |
| 2015/0082441 A1 | 3/2015 | Gathala et al. |
| 2015/0089632 A1 | 3/2015 | Bartholomew et al. |

OTHER PUBLICATIONS

Douglas "Embrace the BYOD Future with Mobile Cloud Computing Applications", Published on: Feb. 14, 2013, Available at: http://www.zeroonezero.com/blog/index.php/iphoneipad-application-development/embrace-the-byod-future-with-mobile-cloud-computing-applications/.

"Why MAM is important for CIOs", Published on: Jun. 10, 2013, Available at: http://www.cxotoday.com/story/why-mam-is-important-for-cios/.

Miller, Doug, "BYOD Not Dead, Long Live BYOD", Published on: Oct. 16, 2013, Available at: http://insights.wired.com/profiles/blogs/byod-is-not-dead#axzz2iLB5G2QP.

"International Search Report & Written Opinion Received for PCT Patent Application No. PCT/US2014/068977", Mailed Date: May 7, 2015, 18 Pages.

"International Preliminary Report on Patentability Issued in PCT Application No. PCT/US2014/068977", Mailed Date: Jun. 23, 2016, 13 Pages.

"International Search Report & Written Opinion for PCT Application No. PCT/US2014/068976", Mailed Date: Jun. 12, 2015, 16 Pages.

Abad, et al., "Log Correlation for Intrusion Detection: A Proof of Concept", In Proceedings of the 19th Annual Computer Security Applications Conference, Dec. 8, 2003, 10 Pages.

Dai, et al., "MAPMon: A Host-Based Malware Detection Tool", In the 13th IEEE International Symposium on Pacific Rim Dependable Computing, Dec. 17, 2007, pp. 349-356.

"Office Action", U.S. Appl. No. 14/104,570, Mailed Date: Apr. 8, 2015, 20 Pages.

"Notice of Allowance," U.S. Appl. No. 14/104,570, Mailed Date: Sep. 29, 2015, 14 Pages.

Written Opinion of the International Preliminary Examining Authority for PCT Application No. PCT/US2014/068976, Mailed Date: Nov. 6, 2015, 5 Pages.

"Office Action", U.S. Appl. No. 14/928,574, Mailed Date: May 20, 2016, 24 Pages.

"Office Action", U.S. Appl. No. 14/928,574, Mailed Date: Sep. 16, 2016, 6 Pages.

* cited by examiner

CONFIGURING APPLICATIONS AND POLICIES IN NON-COOPERATIVE ENVIRONMENTS

CROSS-REFERENCE TO RELATED APPLICATIONS

This application is related to U.S. patent application Ser. No. 14/104,570, entitled, "Managing Applications In Non-Cooperative Environments", filed Dec. 12, 2013, which is hereby incorporated by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In corporate computing environments, employees are often permitted to connect their personal devices (e.g., smartphones) to the corporate IT infrastructure. Allowing employees access to corporate resources through personal devices can increase employee efficiency and productivity. For example, an employee may have their smartphone with them nearly all the time, even when they are not at work. As such, the employee also has efficient access to many corporate resources nearly all the time.

However, permitting employees to access corporate resources via personal devices also opens the corporate IT infrastructure to various security risks. Most operating systems and applications for personal devices are not written with management in mind. That is, these operating systems and applications are not extensible and do not have a management surface that an IT professional can use to regulate and, when appropriate, disable the operating system or application. Thus, employees can easily use a personal device to transfer corporate resources between systems inside a corporate IT infrastructure and (potentially unsecure) systems outside of the corporate IT infrastructure. Among other things, these types of data transfer provide a vector for malicious activity, make it more difficult to comply with laws and regulations, such as, The Health Insurance Portability and Accountability Act ("HIPPA") and Sarbanes-Oxley, and make it difficult to remove access for terminated employees.

BRIEF SUMMARY

The present invention extends to methods, systems, and computer program products for configuring applications and policies in non-cooperative environments. In some embodiments, an application is configured to comply with a policy. A graphical element is presented at a display device. The graphical element represents that an amended application is available for execution. The graphical element is taken from a target application. The graphical element is presented on the display device to make it appear as if the amended application is the target application. The amended application includes a hooking library.

User input selecting the graphical element is received. In response to receiving the user input, the hooking library is loaded.

An environment for executing the target application is configured. Configuring the environment includes accessing a policy for the target application. The policy includes one or more policy elements. Configuring the environment also includes matching the one or more policy elements to APIs that are to be monitored by the hooking library. In conjunction with loading the hooking library, the target application is executed in the configured environment.

An environment for executing the target application is configured. Configuring the environment includes accessing a policy for the target application. The policy includes one or more policy elements. Configuring the environment also includes matching the one or more policy elements to Application Program Interfaces (APIs) that are to be monitored by the hooking library. In conjunction with loading the hooking library, the target application is executed in the configured environment.

The target application is executed subsequent to configuring the amended application to monitor the one or more APIs. An API request from the target application to an API from among the one or more APIs is detected. The behavior of the target application is adjusted in accordance with the policy in response to detecting the call to the API.

In further embodiments, executing a target application is attempted subsequent to configuring the amended application to monitor the one or more APIs. It is determined that a defined management action is not satisfied. Execution of the target application is prevented based on determining that the defined management action is not satisfied.

In additional embodiments, the visual state of a target application is tracked by storing visual state data for the target application. In these additional embodiments, the stored visual state data is used in adjusting the behavior of the target application. It is determined that the amended application is to present a custom user interface. The visual context is switched to the amended application. The amended application injects the custom user interface into the target application. User input is received at the custom user interface. Visual context is switched to the target application subsequent to receiving the user input. The visual state of the target application is restored based on the stored visual state data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
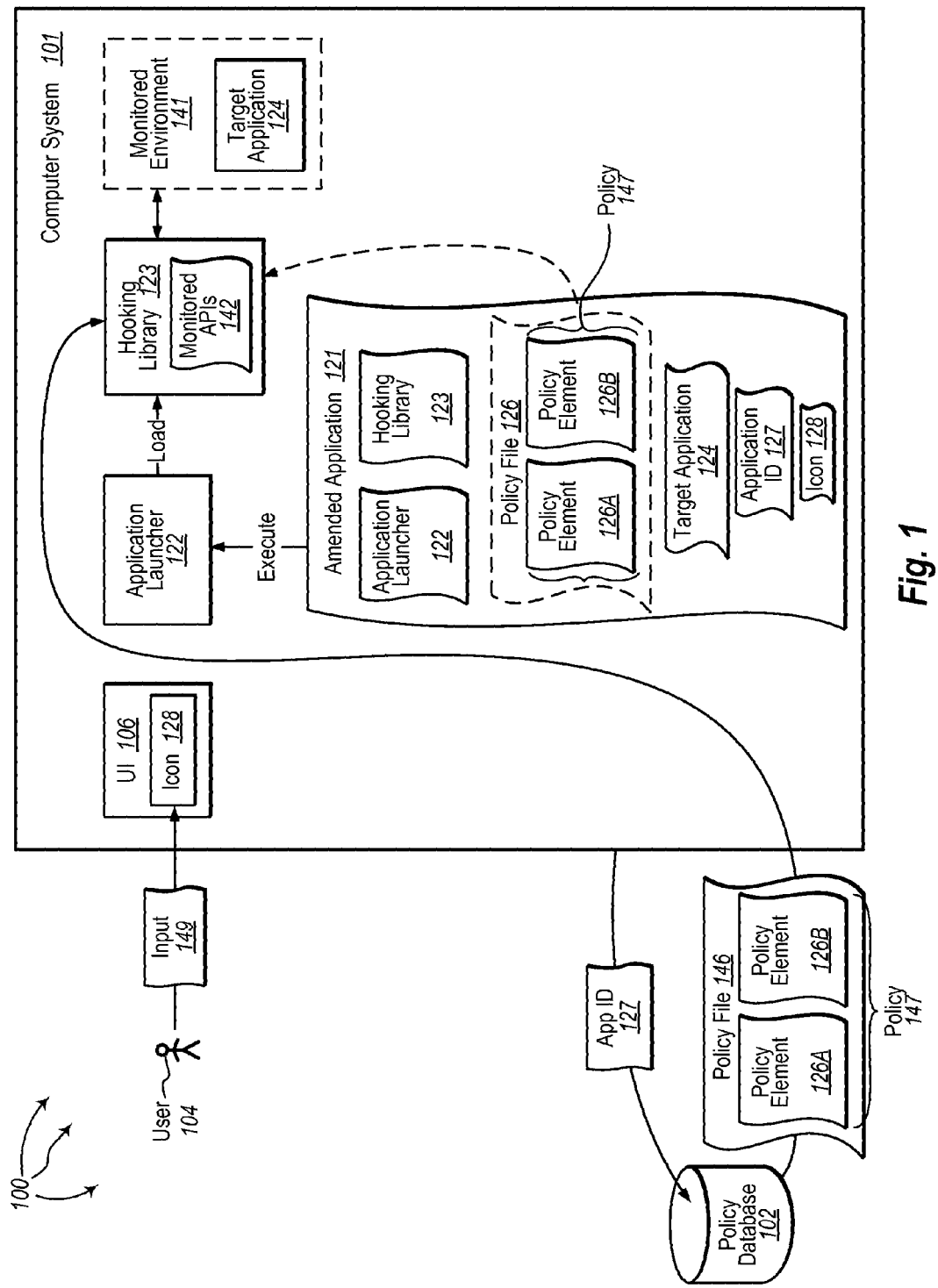
FIG. 1 illustrates an example computer architecture that facilitates configuring an application to comply with a policy.

The present invention extends to methods, systems, and computer program products for configuring applications and policies in non-cooperative environments. In some embodiments, an application is configured to comply with a policy. A graphical element is presented at a display device. The graphical element represents that an amended application is available for execution. The graphical element is taken from a target application. The graphical element is presented on the display device to make it appear as if the amended application is the target application. The amended application includes a hooking library.

User input selecting the graphical element is received. In response to receiving the user input, the hooking library is loaded.

An environment for executing the target application is configured. Configuring the environment includes accessing a policy for the target application. The policy includes one more policy elements. Configuring the environment also includes matching the one or more policy elements to APIs that are to be monitored by the hooking library. In conjunction with loading the hooking library, the target application is executed in the configured environment.

An environment for executing the target application is configured. Configuring the environment includes accessing a policy for the target application. The policy includes one more policy elements. Configuring the environment also includes matching the one or more policy elements to Application Program Interfaces (APIs) that are to be monitored by the hooking library. In conjunction with loading the hooking library, the target application is executed in the configured environment.

The target application is executed subsequent to configuring the amended application to monitor the one or more APIs. An API request from the target application to an API from among the one or more APIs is detected. The behavior of the target application is adjusted in accordance with the policy in response to detecting the call to the API.

In further embodiments, executing a target application is attempted subsequent to configuring the amended application to monitor the one or more APIs. It is determined that a defined management action is not satisfied. Execution of the target application is prevented based on determining that the defined management action is not satisfied.

In additional embodiments, the visual state of a target application is tracked by storing visual state data for the target application. In these additional embodiments, the stored visual state data is used in adjusting the behavior of the target application. It is determined that the amended application is to present a custom user interface. The visual context is switched to the amended application. The amended application injects the custom user interface into the target application. User input is received at the custom user interface. Visual context is switched to the target application subsequent to receiving the user input. The visual state of the target application is restored based on the stored visual state data.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the application provide the ability to configure non-cooperative applications and operating systems to comply with a policy. For example, applications and operating systems at a user's (e.g., an information worker's) personal device (e.g., smartphone) can be appropriately configured to provide more secure access to a corporate IT infrastructure. An IT worker can programmatically repackage an application to comply with a policy, deploy it to a user's personal device, and adjust the application's behavior during execution to comply with the policy. Example policies include: requiring authentication before use, requiring encryption of data, limiting a users' ability to transfer data in and out of the application, requiring a computing device to be within a specified geographic area, permitting access to an application during a specified time window, etc.

Adjusted behavior can include injecting custom user interfaces into an application to support scenarios such as user authentication (at application launch and/or refreshed periodically), displaying a custom branding page, displaying a terms of use page, etc. Injecting a custom user interface can be facilitated by tracking visual context for an application across one or more displays and switching between the application's visual context and the custom user interface.

As depicted, computer system 101 includes user interface 106. User interface 106 can be used to present icons for corresponding applications (application that are available for execution). In response to receiving input selecting an icon for an amended application, an application launcher for the amended application can be executed. The application launcher can subsequently load a hooking library configured to monitor API calls between an associated (e.g., embedded) target application and other external libraries. The hooking library can also enforce an assigned policy for the associated (e.g., embedded) target application.

As depicted, computer system 101 includes user interface 106. User interface 106 can be used to present icons for corresponding applications (application that are available for execution. In response to receiving input selecting an icon for a amended application, an application launcher for the amended application can be executed. The application launcher can subsequently load a hooking library configured to monitor API calls between an associated (e.g., embedded) target application and other external libraries. The hooking library can also enforce an assigned policy for the associated (e.g., embedded) target application.

Generally, policy can be used to manage an information worker's (or other user's) ability to use the target application. Policy for an application can be contained within the application or managed at a server. An application identifier can be used by a server (or other computer system) to match policy to a corresponding application (either during packaging or subsequent enforcement).

Policy database 102 stores policy that is used to configure applications. Computer system 101 can access policy from policy database 102. In some embodiments, computer system 101 accesses policy for an amended application from policy database 102. During packaging of an amended application, an application identifier can be associated with the amended application. To obtain policy for the amended application, computer system 101 can send the application identifier to policy database 102. Policy database 102 can match the application identifier to the policy for the amended application. Policy database 102 can return the policy to computer system 101.

Figure 2:
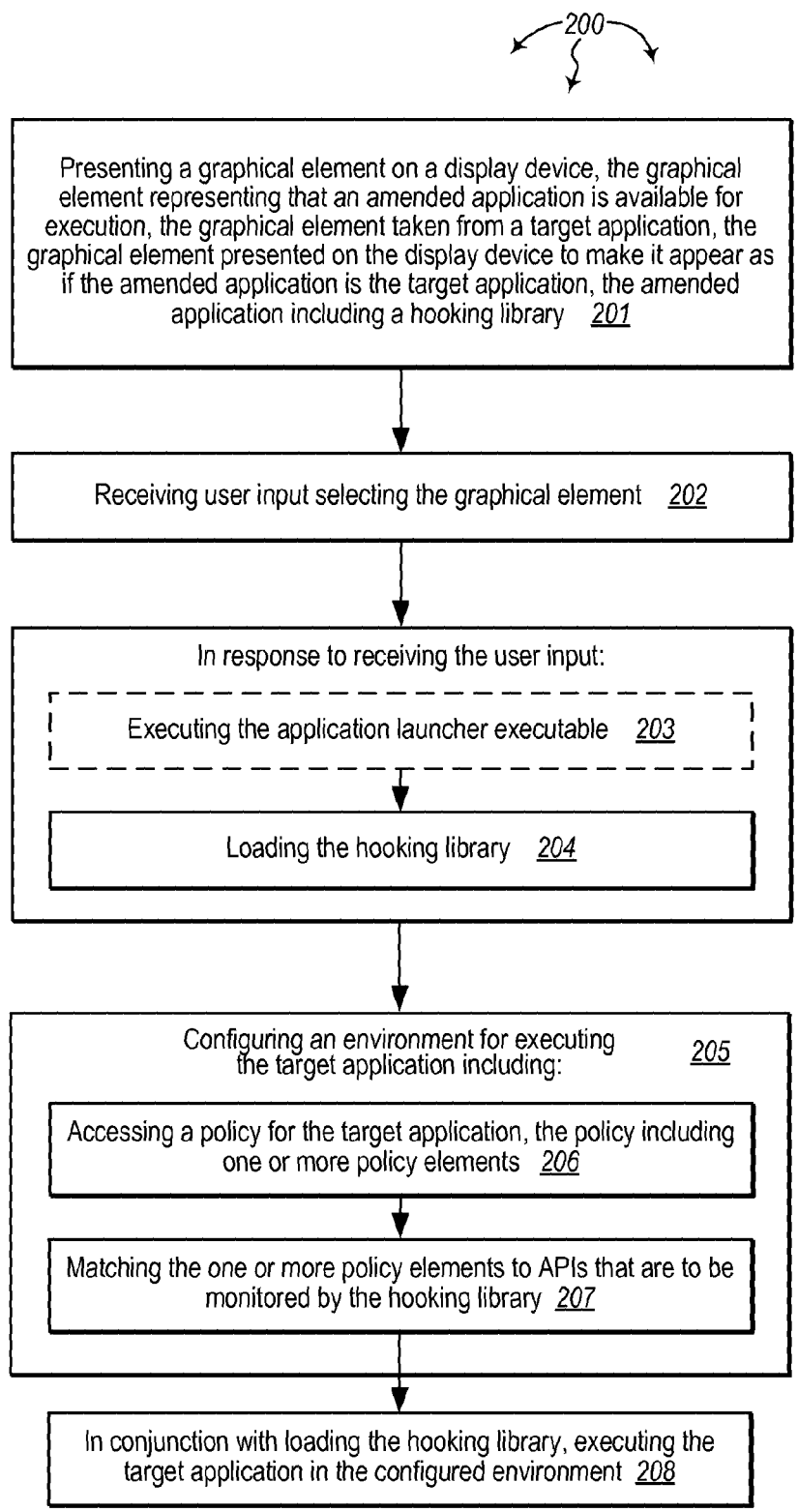
FIG. 2 illustrates a flow chart of an example method for configuring an application to comply with a policy.

FIG. 2 illustrates a flow chart of an example method for configuring an application to comply with a policy. Method 200 will be described with respect to the components and data of computer architecture 100.

Method 200 includes presenting a graphical element for user selection of an amended application on a display device, the graphical element taken from a target application, the graphical element presented on the display device to make it appear as if the amended application is the target application, the amended application including a hooking library (201). For example, computer system 101 can present icon 128 at user interface 106. Icon 128 represents that amended application 121 is available for execution. Icon 128 is taken from target application 124. As such, icon 128 is presented at user interface 106 to make it appear as if amended application 121 is target application 124. As depicted, amended application 121 includes application launcher 122 and hooking library 123.

Method 200 includes receiving user input selecting the graphical element (202). For example, user 104 can submit input 149 to computer system 101 to select icon 128. Computer system 101 can receive input 149. Method 200 optionally includes, in response to receiving the user input, executing the application launcher executable (203). For example, in response to receiving user input 149, computer system 101 can execute application launcher 122. In other embodiments, a target executable is executed in response to receiving user input. Method 200 includes, in response to receiving the user input, loading the hooking library (204). In some embodiments, an application launcher loads a hooking library. For example, in response to user input 149, application launcher 122 can load hooking library 123. In other embodiments, a target executable is modified to load a hooking library. For example, target application 124 can be modified to load hooking library 123. In these embodiments, an application launcher (e.g., application launcher 122) may not be used.

Method 200 includes configuring an environment for executing the target application (205). For example, hooking library 123 can configure monitored environment 141 for executing target application 124.

Configuring an environment for executing the target application includes accessing a policy for the target application, the policy including one or more policy elements (206). For example, hooking library 123 can access policy 147 including policy elements 126A and 126B. Policy elements 126A and 126B can indicate to hooking library 123 what management operations are to be taken for target application 124. Management operations can include denying cut and paste, requiring data encryption, requiring user authorization, disabling target application 124, requiring that computer system 101 be within the bounds of a specified geographic area for target application 124 to be enabled, allowing access to target application 124 only during a specified time window, etc.

In some embodiments, computer system 101 sends application ID 127 to policy database 102. Policy database 102 matches application ID 127 to corresponding policy elements for amended application 121 (and that are to be enforced against target application 124). Policy database 102 returns a policy file back to computer system 101. For example, policy database 102 can return policy file 146, containing policy elements 126A and 126B, back to computer system 101.

In other embodiments, hooking library 123 accesses policy elements 126A and 126B from policy file 126, which is contained in amended application 121.

Configuring an environment for executing the target application includes matching the one or more policy elements to APIs that are to be monitored by the hooking library (207). For example, hooking library 123 can match policy elements 126A and 126B to monitored APIs 142. Monitored APIs 142 can include APIs that relate to indicated management operations. For example, if policy 147 defines that cut and paste is disabled for target application 124, monitored APIs 142 can include any APIs relevant to cut and paste operations.

Hooking library 123 can also be configured to monitor other policy related data relevant to ongoing enablement of target application 124, such as, for example, requiring user 104 to (re)authenticate or requiring that computer system 101 be in a specified geographic area. For example, if policy 147 defines that user authentication is required every 30 minutes, hooking library 123 can track relevant time periods related to (re)authentication. When user 149 is not (re)authenticated, stricter data exchange polices can be implemented or target 124 can be disabled.

If policy 147 defines that computer system 101 is required to be within the bounds of a specified geographic area, hooking library 123 can check GPS data for computer system 101. Hooking library 123 can use the GPS data to determine if computer system 101 is within the bounds of the specified geographic area. When computer system 101 is not within the bounds of the specified geographic area, stricter data exchange polices can be implemented or target 124 can be disabled.

If policy 147 defines that target application 124 is available during a specific time window, hooking library can check time data for computer system 101. Hooking library 123 can use time data to determine if a current time is within the specified time window. When the current time is not within the specified time window, stricter data exchange polices can be implemented or target 124 can be disabled.

Method 200 includes in conjunction with loading the hooking library, executing the target application in the configured environment (208). For example, target application 124 can be executed in monitored environment 141.

Accordingly, a computer system can be configured to enforce a policy for an application (e.g., a target application). The application can be monitored for compliance with the policy while the application is executing.

Figure 3A:
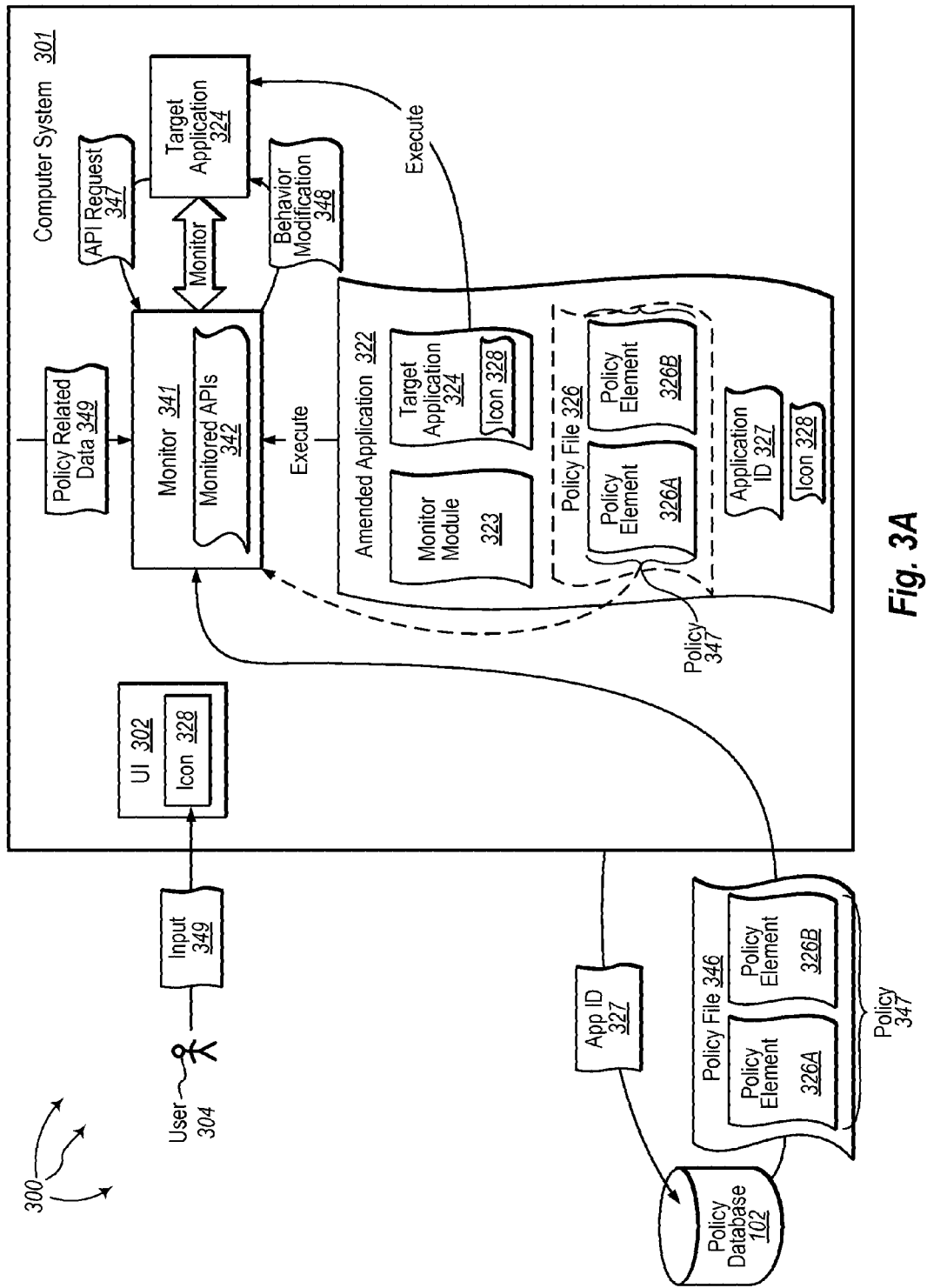
FIG. 3A illustrates an example computer architecture that facilitates enforcing a policy for an application.
Figure 3B:
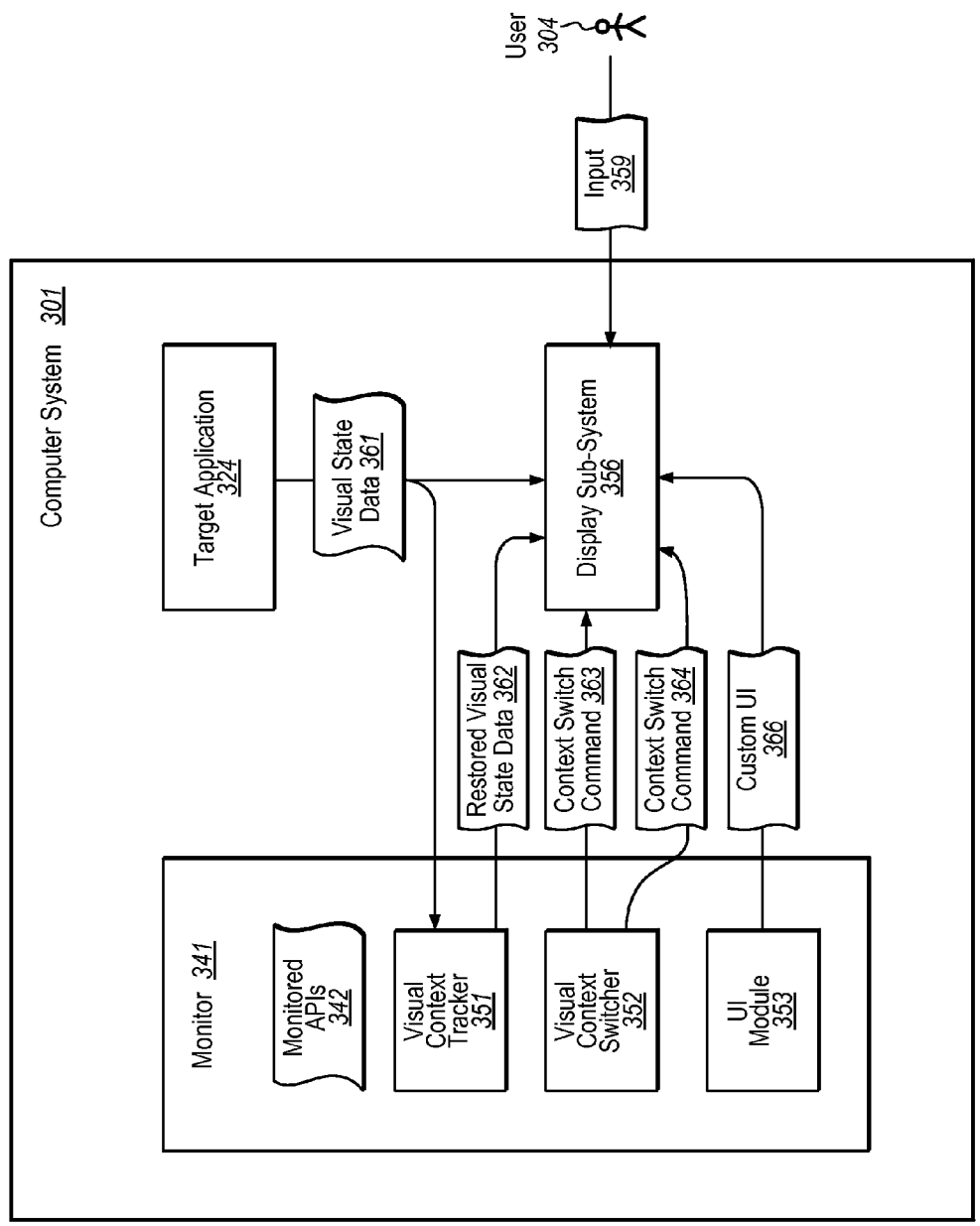
FIG. 3B illustrates an example computer architecture that facilitates tracking the visual state of an application.

FIGS. 3A and 3B illustrate an example computer architecture that facilitates enforcing a policy for an application and that facilitates tracking the visual state of an application. Referring to FIG. 3A, computer architecture 300 includes computer system 301 (e.g., a mobile phone or tablet) and policy database 102. Each of computer system 301 and policy database 102 can be connected to one another over (or be part of) a network, such as, for example, a Local Area Network ("LAN"), a Wide Area Network ("WAN"), and even the Internet. Accordingly, computer system 301 and policy database 102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Turning to FIG. 3A, computer system 301 includes user interface 302. User interface 302 can be used to present icons 328, etc., for corresponding applications that are available for execution. For example, icon 328 can be presented at user interface 302 to indicate that amended application 322 is available for execution. Generally, in response to receiving input selecting an icon for an amended application, a monitor (e.g., monitor 341) for monitoring the corresponding associated (e.g., embedded) target application (e.g., target application 324) can be executed. The monitor can monitor calls between the target application and other external libraries, monitor other policy related data, and also enforce an assigned policy for the target application.

Figure 4:
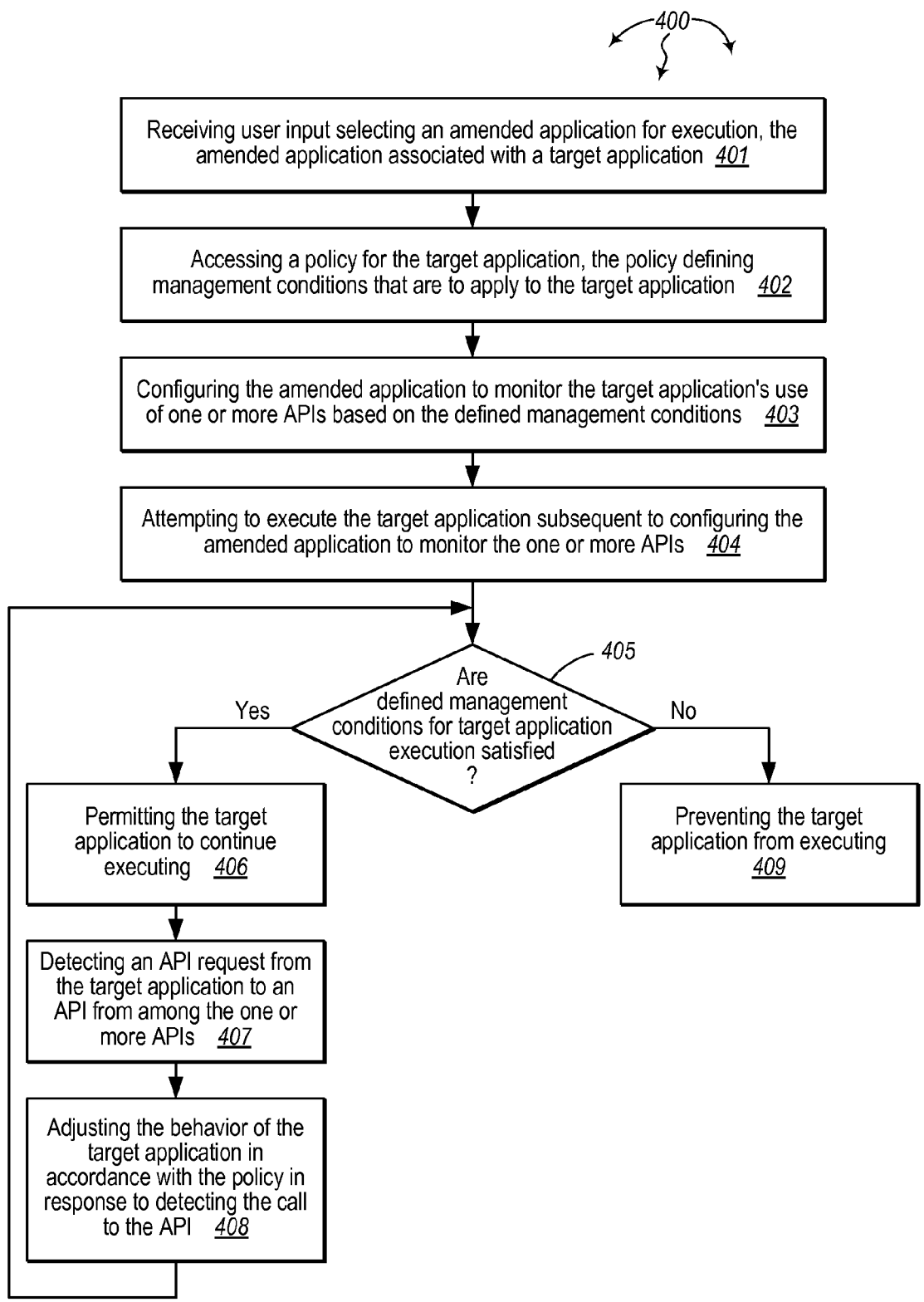
FIG. 4 illustrates a flow chart of an example method for enforcing a policy for an application.

FIG. 4 illustrates a flow chart of an example method 400 for enforcing a policy for an application. Method 400 will be described with respect to the components and data of computer architecture 300.

Method 400 includes receiving user input selecting an amended application for execution, the amended application associated with a target application (401). For example, user 304 can submit input 349 to computer system 301. Input 349 can be received by computer system 301. Input 349 can be a selection of icon 328 from user interface 302 (indicating that amended application 322 is to be executed).

Method 400 includes accessing a policy for the target application, the policy defining management conditions that are to apply to the target application (402). For example, monitor 341 can access policy 347. Policy 347 includes policy elements 326A and 326B defining management conditions that are to apply to target application 324. Management conditions can include: denying cut and paste, requiring data encryption, requiring user authorization, disabling target application 124, requiring that computer system 101 be within the bounds of a specified geographic area for target application 124 to be enabled, allowing access to the target application 124, during a specified time window, etc.

Method 400 includes accessing a policy for the target application, the policy defining management conditions that are to apply to the target application (402). For example, monitor 341 can access policy 347. Policy 347 includes policy elements 326A and 326B defining management conditions that are to application to target application 324. Management conditions can include: denying cut and paste, requiring data encryption, requiring user authorization, disabling target application 124, requiring that computer system 101 be within the bounds of a specified geographic area for target application 124 to be enabled, allowing access to the target application 124, during a specified time window, etc.

In some embodiments, computer system 301 sends application ID 327 to policy database 102. Policy database 102 matches application ID 327 to corresponding policy elements for amended application 322 (and that are to be enforced against target application 324). Policy database 102 returns a policy file back to computer system 301. For example, policy database 102 can return policy file 346, containing policy elements 326A and 326B, back to computer system 301.

In other embodiments, monitor 341 accesses policy elements 326A and 326B from policy file 326, which is contained in amended application 322.

Method 400 includes configuring the amended application to monitor the target application's use of one or more APIs based on the defined management conditions (403). For example, monitor 341 can be configured to monitor monitored APIs 342 based on defined management conditions for target application 324. Monitored APIs 342 can include APIs that relate to indicated management conditions. For example, if policy 147 defines that data encryption is required, monitored APIs 342 can include any APIs relevant to data encryption. Accordingly, monitor 341 can be configured to monitor calls between target application 324 and other external libraries.

Monitor 341 can also be configured to monitor other policy related data relevant to ongoing enablement of target application 324, such as, for example, data related to (re)authenticating user 304, data related to the geographic location of computer system 301, or data related to the time at computer system 304.

Method 400 includes attempting to execute the target application subsequent to configuring the amended application to monitor the one or more APIs (404). For example, computer system 301 can attempt to execute target application 324 subsequent to configuring monitor 341 to monitor monitored APIs 342 (and subsequent to configuring monitor 341 to monitor any other policy related data).

When defined management conditions are satisfied (YES at 405), method 400 includes permitting the target application to continue executing (406). For example, when management conditions for target application 324 are satisfied, target application 324 is permitted to execute (or continue executing). When defined management conditions are satisfied (YES at 405), method 400 includes detecting an API request from the target application to an API from among the one or more APIs 007). For example, monitor 341 can detect API request 347 from target application 324 to an API in monitored APIs 342. API request 347 can be related to exchanging data with another computer system.

When defined management conditions are satisfied (YES at 405), method 400 includes adjusting the behavior of the target application in accordance with the policy in response to detecting the API request (408). For example, monitor 341 can send behavior modification 348 to target application 324 in response to detecting API request 347. Behavior modification 348 can modify the behavior of target application 324 in accordance (and for compliance) with policy 347. For example, if target application 324 is not using data encryption, monitor 341 can modify the behavior of target application 324 to use data encryption.

When defined management conditions are not satisfied (NO at 405), method 400 includes preventing the target application from executing (409). For example, when management conditions for target application 324 are not satisfied, target application 324 is prevented from executing. When target application 324 is already executing, execution of target application 324 can be disabled. For example, monitor 341 can disable target application 324 when user 304 fails to re-authenticate after a specified time period, when computer system 301 transitions from inside to outside a specified geographic area (e.g., leaves a country, is further than a specified distance from a corporate office, etc.), or when a current time is outside a specified time window.

When defined management conditions are not satisfied (NO at 405), method 400 includes preventing the target application from executing. For example, when management conditions for target application 324 are not satisfied, target application 324 is prevented from executing. When target application 324 is already executing, execution of target application 324 can be disabled. For example, monitor 341 can disable target application 324 when user 304 fails to re-authenticate after a specified time period, when computer system 301 transitions from inside to outside a specified geographic area (e.g., leaves a country, is further than a specified distance from a corporate office, etc.), or when a current time is outside a specified time window.

In some embodiments, a behavior modification can include injecting a custom user interface into target application 324 (e.g., prompting user 304 to authenticate). Turning to FIG. 3B, monitor 341 can further include visual context tracker 351, visual context switcher 352, and user interface module 353. Computer system 301 can also include display sub-system 356.

User interface module 353 is configured to generate a custom UI for injecting into target application 324. Visual context switcher 352 is configured to switch visual context between target application 324 and the generated custom UI.

Display sub-system 356 is configured to display graphical elements for a component corresponding to the current visual context. Display sub-system 356 can also receive user input related to displayed graphical elements (e.g., text entered into a text box).

Visual context tracker 351 is configured to track visual state data associated with target application 324. As such, monitored APIs 342 can also include APIs related to user interface windows, including but not limited to: APIs for setting window visibility, APIs for setting window z-order, APIs for setting window screen, APIs for setting window position, and APIs setting window focus, etc. When visual context is transitioned to target application 324, visual context tracker 351 can also send restored visual state data to display sub-system 356 to appropriately restore the visual state of target application 324.

Figure 5:
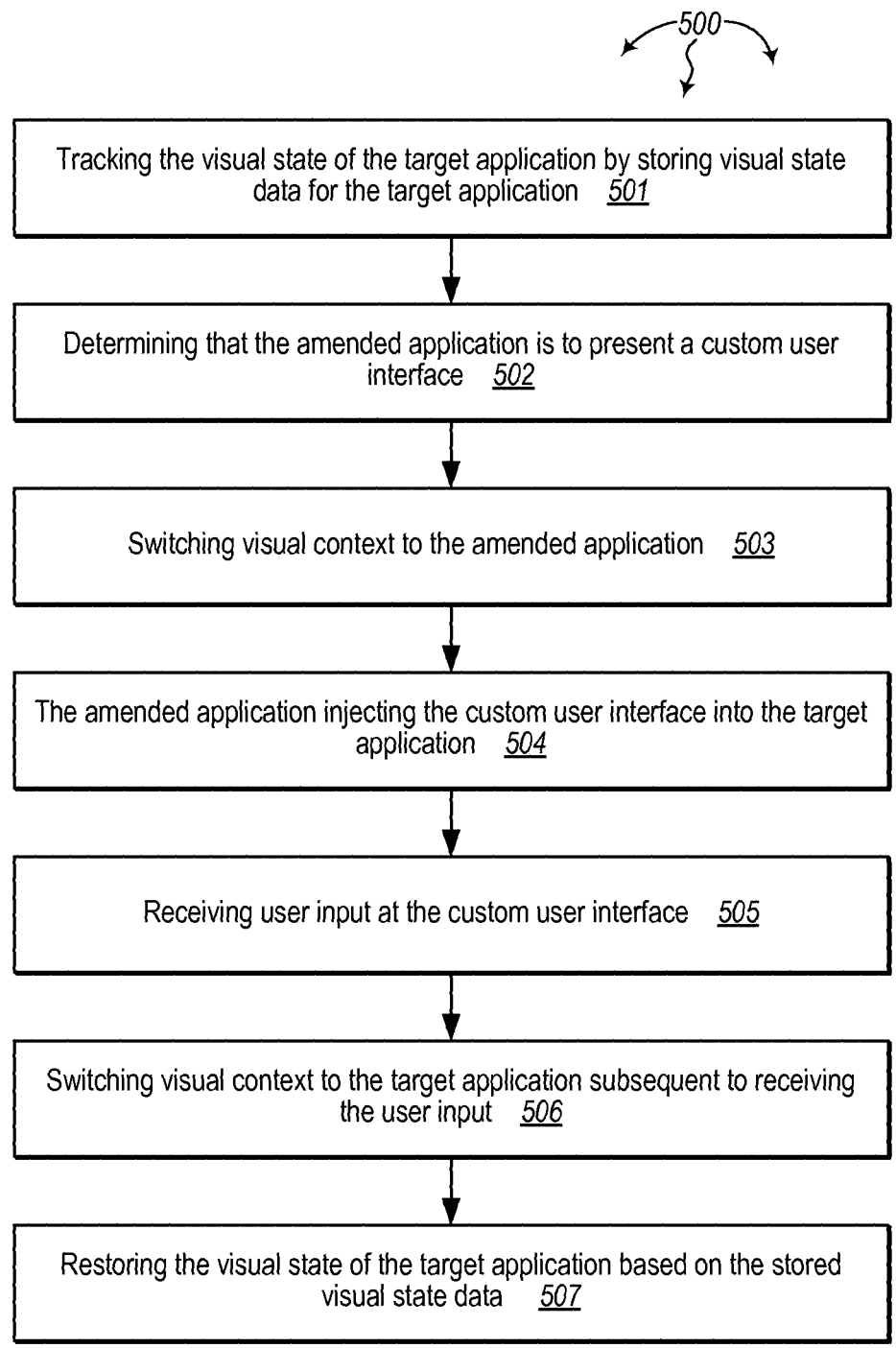
FIG. 5 illustrates a flow chart of an example method for tracking the visual state of an application.

FIG. 5 illustrates a flow chart of an example method 500 for tracking the visual state of an application. Method 500 will be described with respect to the components and data of computer architecture 300.

Method 500 includes tracking the visual state of the target application by storing visual state data for the target application (501). For example, visual context tracker 351 can track the visual state of target application 324 by storing visual state data 361. Method 500 includes determining that the amended application is to present a custom user interface (502). For example, monitor 341 can determine that custom user interface 366 is to be presented. Custom user interface 366 can provide error messages or notifications to user 304, request input from user 304, indicate reasons for non-compliance with policy 347, etc.

In some embodiments, the determination to present a custom interface can be based on policy 347 in view of policy related data 349. For example, policy 347 may define that user 304 is to be re-authenticated every hour. When policy related data 349 indicates that user 304 last authenticated more than one hour ago, monitor 341 can determine that a custom user interface for re-authenticating (e.g., with text fields for username and password) is to be presented.

Method 500 includes switching visual context to the amended application (503). For example, visual context switcher 352 can send context switch command 363 to display sub-system 356. Context switch command 363 can instruct display sub-system to switch visual context to user interface module 353. Method 500 includes the amended application injecting the custom user interface into the target application (504). For example, user interface module 353 can inject custom user interface 366 (e.g., an authentication user interface) into target application 324.

Method 500 includes receiving user input at the customer user interface (505). For example, user 304 can enter input 359 (e.g., a user name and password) into custom user interface 366. Display sub-system 356 can receive input 359 entered through custom user interface 366. Input 359 can be forwarded to an appropriate authentication module for validation. The results of validating input 359 can be reflected in policy related data 349 (and then re-evaluated in view of policy 347 as described).

Method 500 includes switching visual context to the target application subsequent to receiving the user input (506). For example, visual context switcher 352 can send context switch command 364 to display sub-system 356. Context switch command 364 can instruct display sub-system to switch visual context back to target application 324. Method 500 includes restoring the visual state of the target application based on the stored visual state data (507). For example, visual context tracker 351 can send restored visual state data 362 to display sub-system 356. Display sub-system 356 can use restored visual state data 362 to restore the visual state of target application 324 to the visual state target application 324 had prior to presentation of custom user interface 366.

Accordingly, embodiments of the invention can be used to enforce user-authentication on target application launch or target application reactivation, including control content-displayed from the target application.

Controlling content-displayed from a target application can include controlling content displayed from the target application on a main thread. Controlling content-displayed from a target application can also include controlling content displayed from the target application on a background application thread. Some computing systems can stream content to external displays. Thus, controlling content-displayed from a target application can further include controlling content on all display screens. Controlling content-displayed from a target application can additionally include controlling which window the user can interact with on all screens.

In addition to controlling target application content display, monitor 341 can also permit higher priority content to be displayed. Higher priority content can include phone-call notifications, status-bar notifications (e.g., battery-status, connectivity, etc.), alert-notifications (e.g., low-battery messages, etc.), etc. Restored visual state data can be used to restore target application 324 to a prior visual state after the higher priority content is presented.

A target application can be blocked from making its windows visible or accepting input (e.g., before a user has completed authentication) by hooking various user interface window APIs.

To facilitate storing and re-storing visual state data, a stack of visible windows can be maintained per window-level per screen. The following APIs can be hooked as they can affect the stack:

setting window visibility—Setting hidden to YES removes a window from the stack. Setting hidden to NO adds it to the top of the stack in the level for the screen if it's not already in that stack.

setting window Z-order—Levels are ordered so that each level groups windows within it in front of those in all preceding groups. For example, alert windows appear in front of all normal-level windows. When a window enters a new level, it's ordered in front of all its peers in that level. The stacking of levels can take precedence over the stacking of windows within each level. That is, even the bottom window in a level obscures the top window of the next level down. Levels can be listed in order from lowest to highest.

setting window display—By default, windows can be created on a primary device screen. If additional screens are attached to the device, assigning a different screen object to this property causes the window to be displayed on the new screen.

setting window focus—The key window is the window that is designated to receive keyboard and other non-touch related events.

Figure 6:
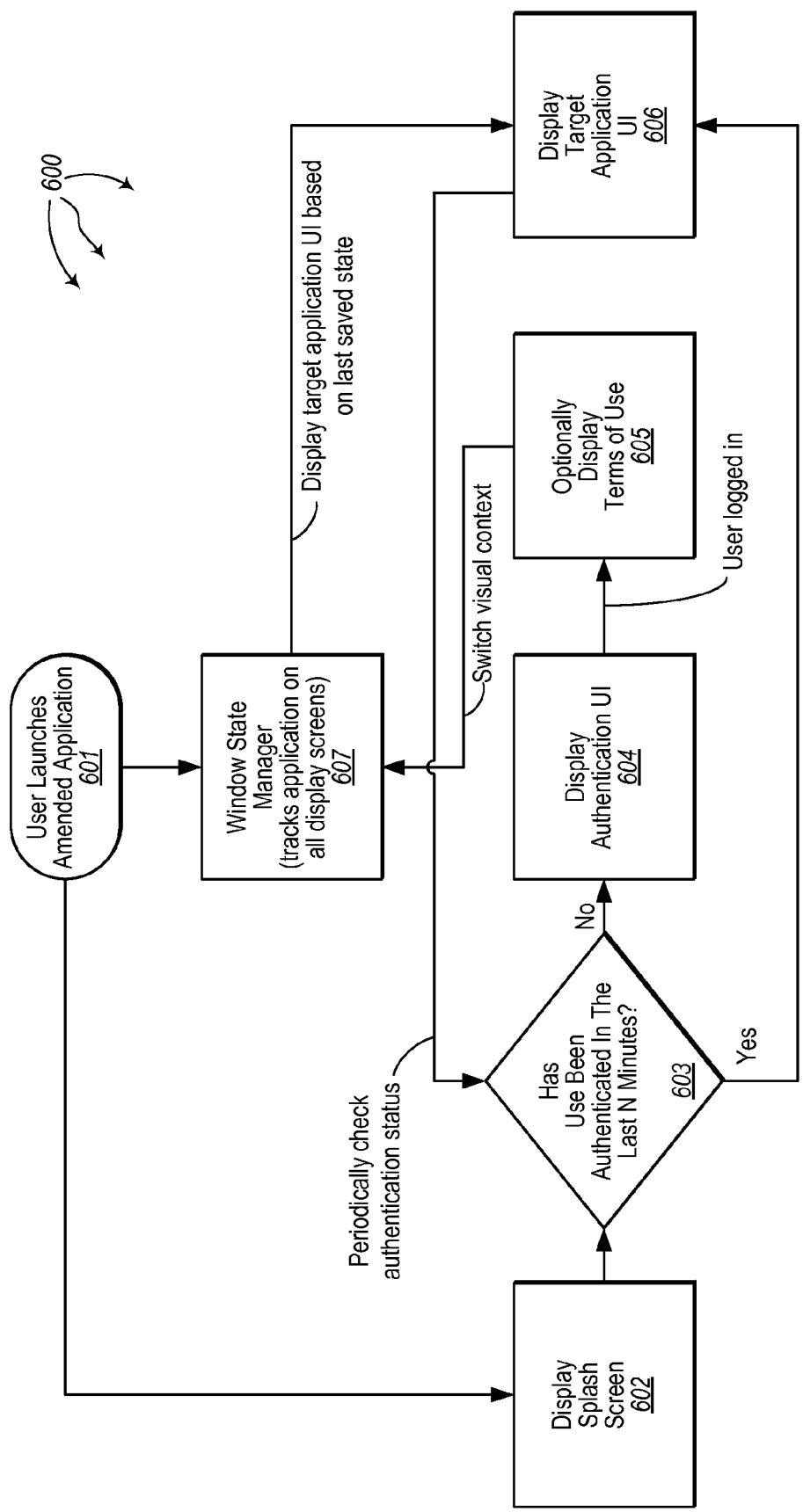
FIG. 6 illustrates an example data flow for injecting a custom authentication user interface into a target application.

FIG. 6 illustrates an example data flow 600 for injecting a custom authentication user interface into a target application. A user can launch an amended application (601). A splash screen, such as, for example, a splash screen from a corresponding target application can be displayed (602). After display a splash screen, a check for authentication can be made (603). A window state manager can track the corresponding target application on all display screens (607). A user interface for the target application can be displayed, such as, for example, based on the last saved state or when a user has been authenticated in the last N minutes (606).

The authentication status of the user is periodically checked. When the user has been authenticated in the last N minutes (YES at 603), the application user interface is displayed (606). When the user has not been authenticated in the last N minutes (NO at 603), an authentication user interface is displayed (604). When the user logs in terms of use can optionally be displayed (605). The visual context can then be switched back to displaying the user interface for the target application.

Accordingly, a computer system can enforce a policy for an application (e.g., a target application). Components of an amended application can modify the behavior of the target application, including injecting a custom user interface, to comply with the policy.

Figure 7A:
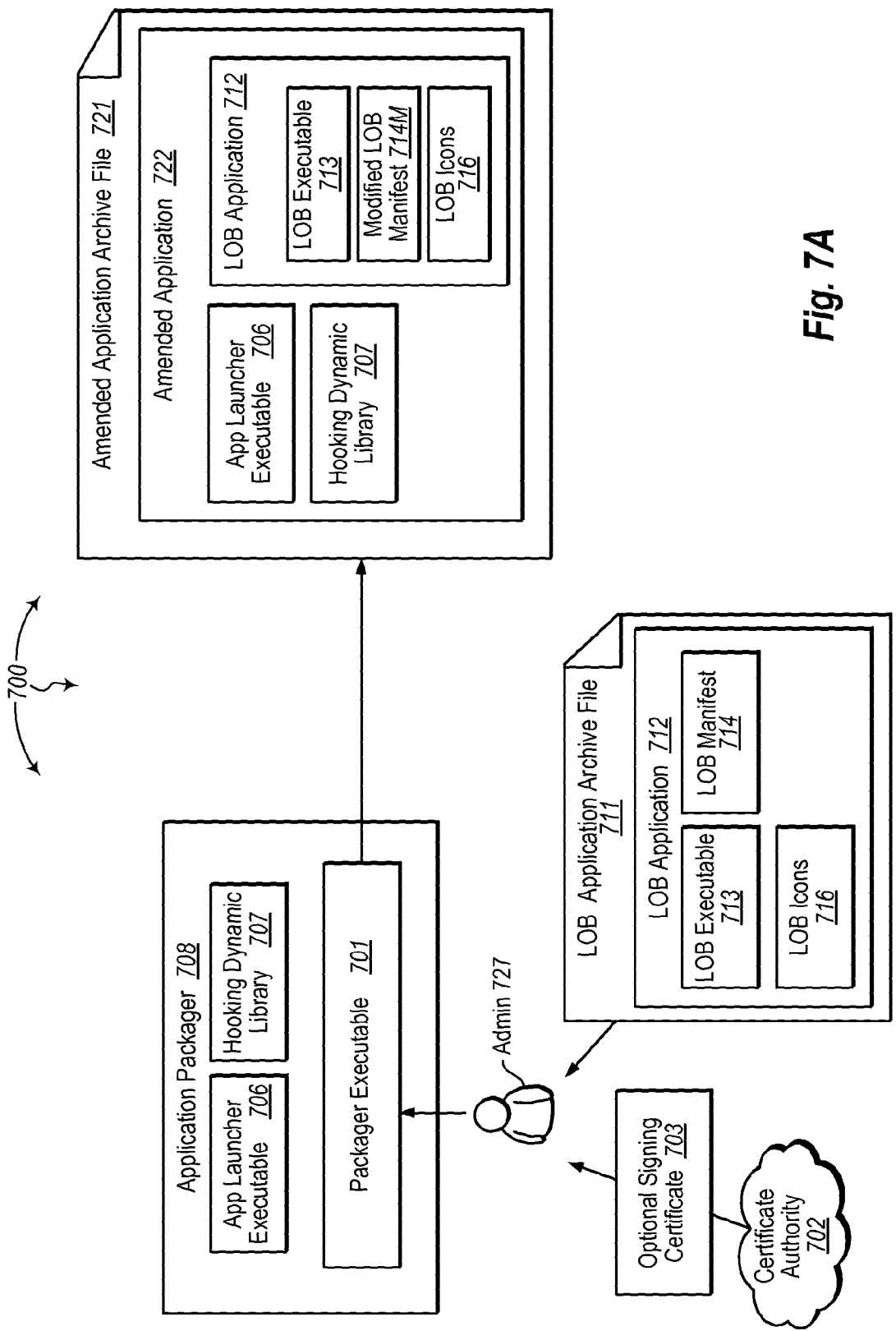
FIG. 7A illustrates an example data flow for packaging an application.

FIG. 7A illustrates a data flow 700 for packaging an application. Generally, application packager 708 can create an amended application for a target application. Application packager 708 can receive a target application as input. Application packager 708 can then modify the target application by creating an amended application and embedding the target application in the amended application. The amended application can include client framework code that enables monitoring of the target application.

As depicted, application packager 708 includes app launcher executable 706 and hooking dynamic library 707. Application packager 708 can include app launcher executable 706 and hooking dynamic library 707 in amended application 722. When amended application 722 is selected for execution, app launcher executable 706 can execute. App launcher 706 can then load hooking dynamic library 707 for monitoring LOB application 712.

More specifically, admin 727 can cause LOB (line of business) application archive file 711 (e.g., an .ipa, an apk file, an .appx file, etc.) along with optional signing certificate 703 (from certificate authority 702) to be sent to application packager 708.

LOB application archive file 711 includes LOB application 712. LOB application 712 (a target application) further includes LOB executable 713, LOB manifest 714, and LOB icons 716. LOB executable 713 is executed when LOB application 712 is selected for execution. LOB manifest 714 can contain settings (e.g., user settings) for LOB application 712. LOB icons 716 can store icons associated with LOB application 712, such as, for example, an icon presented at a user interface to indicate that LOB application 712 can be selected for execution.

Optional signing certificate 703 can be used to sign a resulting amended application.

Packager executable 701 can use optional signing certificate 703 and application archive file 711 to create amended application archive file 721. As depicted, amended application archive file 721 includes amended application 722. Amended application 722 can be signed using optional signing certificate 703.

Amended application 722 further includes app launcher executable 706, hooking dynamic library 707, and LOB application 712. When amended application 722 is selected for execution, app launcher executable 706 can execute. App launcher 706 can then load hooking dynamic library 707 for monitoring embedded LOB executable 713. Modified LOB manifest 714M can contain settings (e.g., user settings) for amended application 722. Modified LOB manifest 714M can include some settings from LOB property list 714 (e.g., settings for giving amended application 722 the look and feel of LOB application 712).

LOB icons 716 can also be used to give amended application 722 the look and feel of LOB application 712. For example, an icon from LOB icons 716 can be presented at a user interface to indicate that amended application 722 is selectable for execution. Other icons in LOB icons 716 can be used during execution of app launcher executable 706.

Figure 7B:
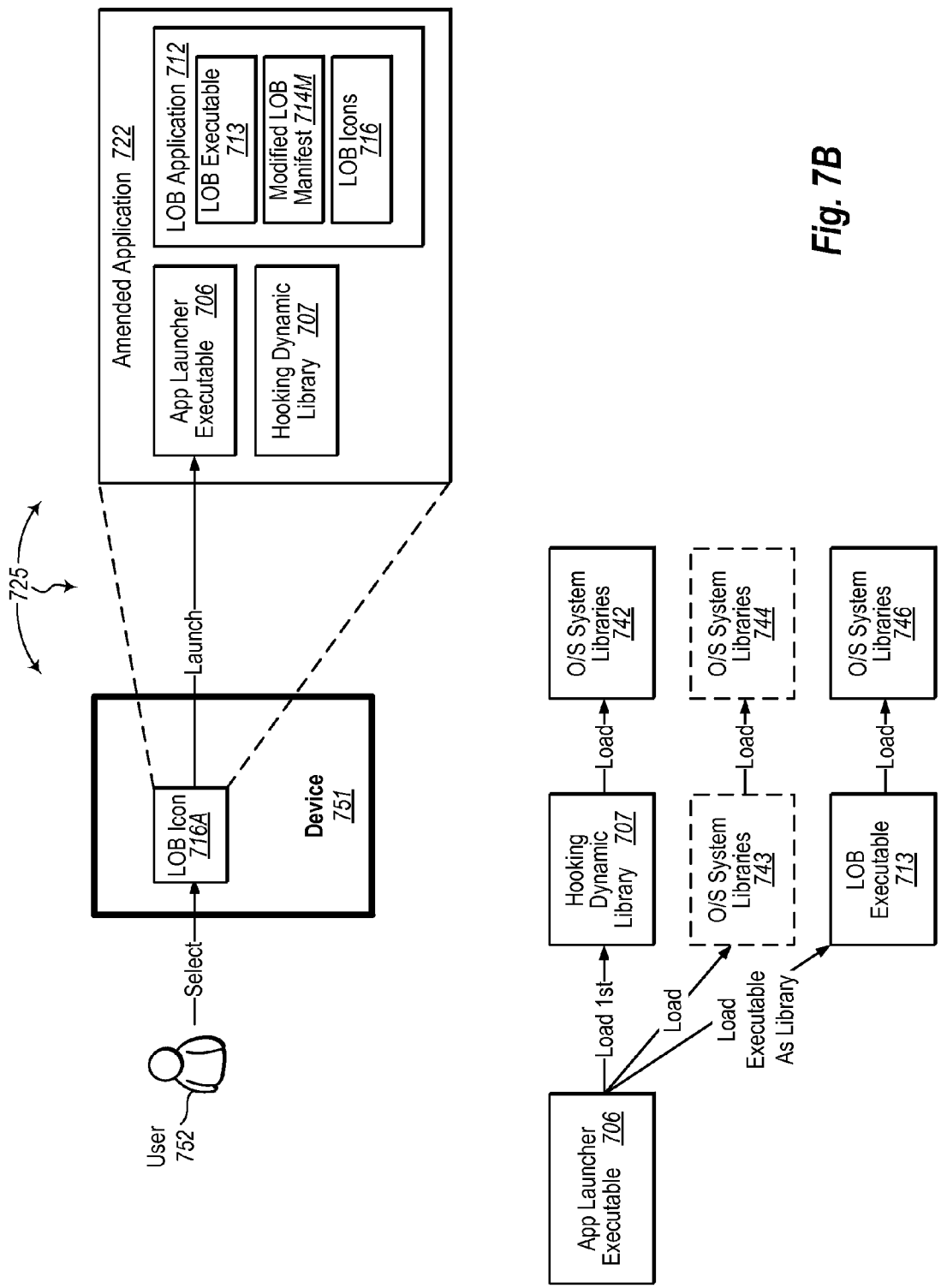
FIG. 7B illustrates an example data flow for enforcing policy against an application.

FIG. 7B illustrates a data flow 725 for executing a target application. Turning to FIG. 7B, amended application archive file 721 can be a mobile application stored at device 751 (e.g., a mobile phone or tablet). LOB icon 716A (an icon contained in LOB icons 716) can be presented at a user interface of device 751. User 752 can select LOB icon 716A. Selecting LOB icon 716A causes app launcher executable 706 to execute.

App launcher executable 706 can first load hooking dynamic library 707 which in turn loads O/S system libraries 742. App launcher executable 706 can also optionally load other O/S libraries, such as, O/S libraries 743, which in turn load other O/S libraries, such as, O/S libraries 744. Subsequent to loading hooking library 707, app launcher executable 706 can also load LOB executable 713 as a library. LOB executable can in turn load O/S libraries 746.

Dynamic hooking library 707 can be configured to monitor API requests from LOB executable 713. In some embodiments, dynamic hooking library 707 exports functions with the same name as system functions. When a symbol is resolved, a resolver can use the first library which exports the symbol. Since dynamic hooking library 707 is loaded first, functions exported by dynamic hooking library 707 get called instead of the intended library functions. Exported functions can include functions related to the exchange of data, such as, for example, fopen( ), open( ), etc. Exported functions can also be used to intercept clipboard data. Accordingly, hooking dynamic library 707 can monitor API requests from LOB executable 713 using exported function techniques.

In other embodiments, the first few instructions of an original function (e.g., fopen ( )) are overwritten to jump to a function in dynamic hooking library 707, which can jump back to the original function if appropriate. In further embodiments, features of a language runtime are used to hook functions. For example, the Objective-C runtime supports replacing methods with custom implementations. As such, hooking dynamic library 707 can monitor API requests from LOB executable 713 using these techniques as well.

During execution, hooking dynamic library 707 can access policy (e.g., from a contained policy file or from a policy database) that is to be enforced against LOB executable 713. Hooking dynamic library 707 can prevent data exchanges with LOB executable 713 when the data exchanges do not comply with the accessed policy. In some embodiments, hooking dynamic library 707 can notify user 752 how to comply with an accessed policy, such as, for example, by authenticating, using encryption, checking GPS coordinates of device 751 against a specified geographic area, or checking time data against a specified time window. When indicated by the accessed policy, hooking dynamic library 707 can also disable LOB executable 713.

Figure 7C:
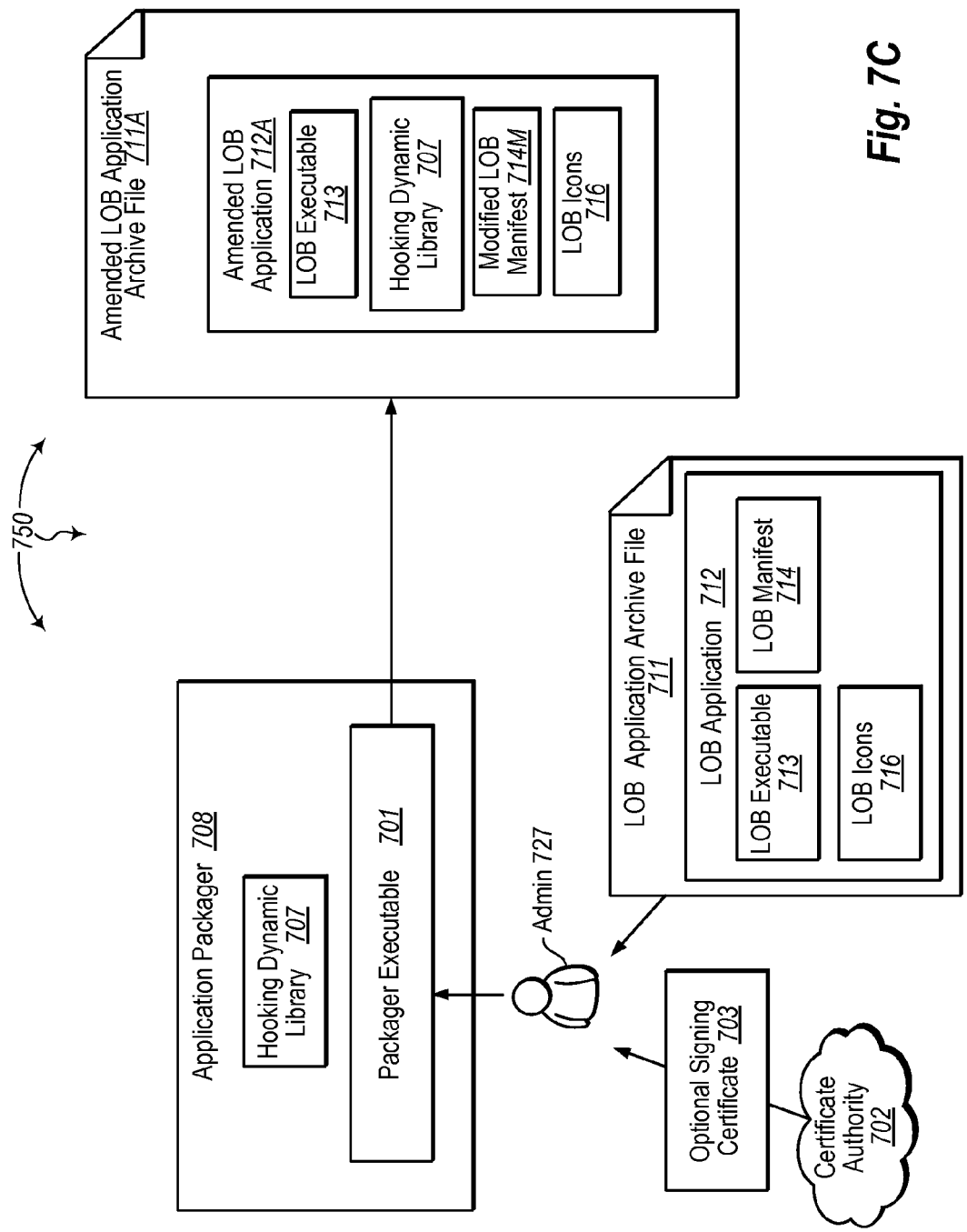
FIG. 7C illustrates another example data flow for packaging an application.

FIG. 7C illustrates a data flow 750 for packaging an application. As described, application packager 708 can create an amended application for a target application. Application packager 708 can receive a target application as input. Application packager 708 can then modify the target application by creating an amended application. The amended application can include client framework code that enables monitoring of the target application.

As depicted, application packager 708 includes hooking dynamic library 707. Application packager 708 can include hooking dynamic library 707 in amended LOB application 712A. LOB executable 713 can also be modified to load hooking dynamic library 707. As such, when amended LOB application 712A is selected for execution, LOB executable 713 can load hooking dynamic library 707. Hooking dynamic library 707 can then monitor LOB executable 713.

More specifically, admin 727 can cause LOB (line of business) application archive file 711 (e.g., an .ipa file, an .apk file, an .appx file, etc.) along with optional signing certificate 703 (from certificate authority 702) to be sent to application packager 708.

LOB application archive file 711 includes LOB application 712. LOB application 712 further includes LOB executable 713, LOB manifest 714, and LOB icons 716. LOB executable 713 is executed when LOB application 712 is selected for execution. LOB manifest 714 can contain settings (e.g., user settings) for LOB application 712. LOB icons 716 can store icons associated with LOB application 712, such as, for example, an icon presented at a user interface to indicate that LOB application 712 can be selected for execution.

Optional signing certificate 703 can be used to sign a resulting amended application.

Packager executable 701 can use optional signing certificate 703 and application archive file 711 to create amended LOB application archive file 711A. As depicted, amended LOB application archive file 711A includes amended LOB application 712A. Amended LOB application 712A can be signed using optional signing certificate 703.

Amended LOB application 712A further includes hooking dynamic library 707. When amended LOB application 712A is selected for execution, LOB executable 713 can execute. LOB executable 713 can then load hooking dynamic library 707. Hooking dynamic library 707 can monitor LOB executable 713. Modified LOB manifest 714M can contain settings (e.g., user settings) for amended LOB application 712A. Modified LOB manifest 714M can include some settings from LOB property list 714 (e.g., settings for giving amended application 712A the look and feel of LOB application 712).

LOB icons 716 can also be used to give amended LOB application 712A the look and feel of LOB application 712. For example, an icon from LOB icons 716 can be presented at a user interface to indicate that amended LOB application 712A is selectable for execution. Other icons in LOB icons 716 can be used during execution of LOB executable 713.

Figure 7D:
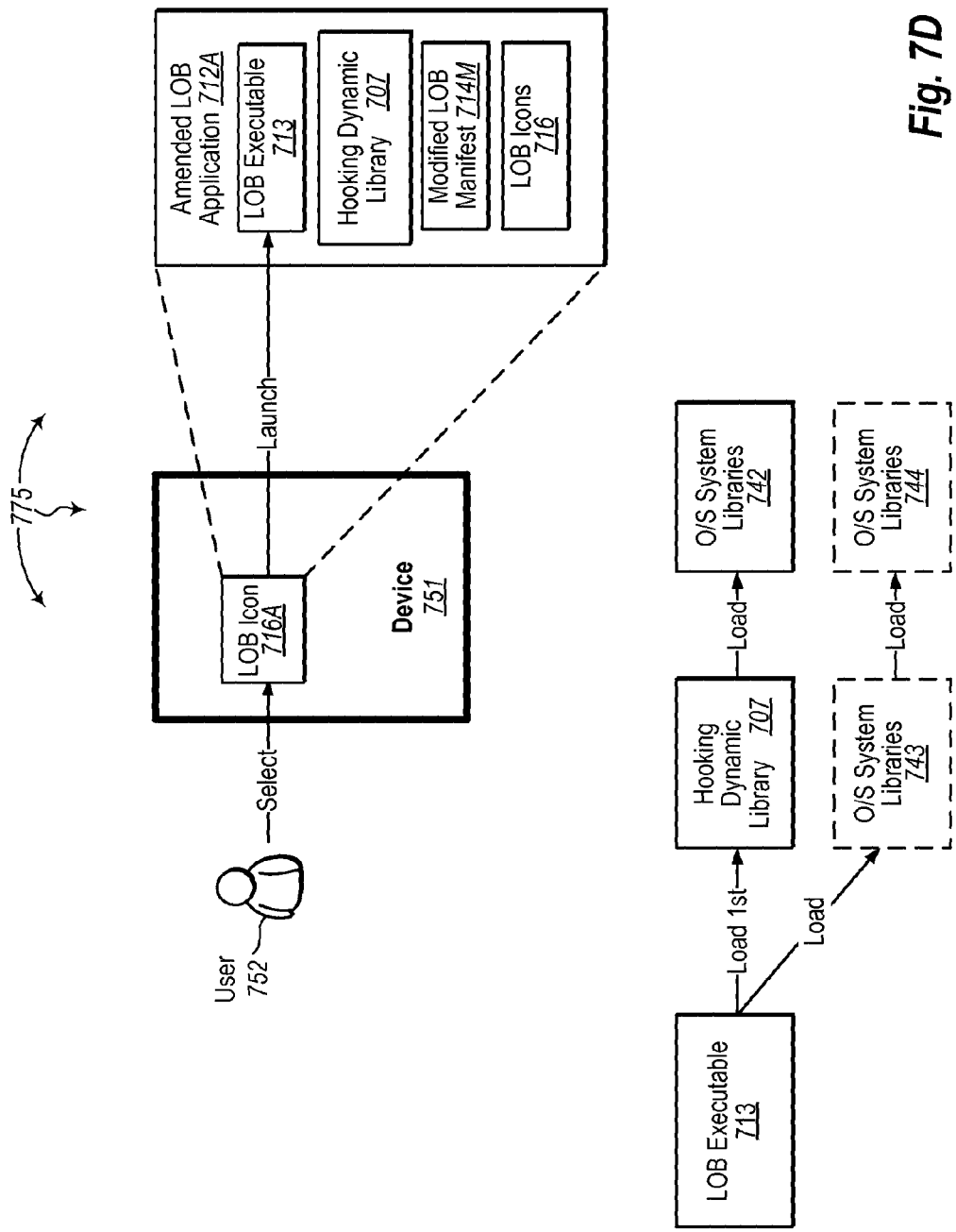
FIG. 7D illustrates another example data flow for enforcing policy against an application.

FIG. 7D illustrates a data flow 775 for executing a target application. Turning to FIG. 7D, amended application archive file 711A can be a mobile application stored at device 751 (e.g., a mobile phone or tablet). LOB icon 716A (an icon contained in LOB icons 716) can be presented at a user interface of device 751. User 752 can select LOB icon 716A. Selecting LOB icon 716A causes LOB executable 713 to execute.

LOB executable 713 can first load hooking dynamic library 707 which in turn loads O/S system libraries 742. LOB executable 713 can also optionally load other O/S libraries, such as, O/S libraries 743, which in turn load other O/S libraries, such as, O/S libraries 744.

Dynamic hooking library 707 can be configured to monitor API requests from LOB executable 713. Accordingly, as described, hooking dynamic library 707 can monitor API requests from LOB executable 713 using exported function techniques, function overwriting techniques, method replacement techniques, etc.

During execution, hooking dynamic library 707 can access policy (e.g., from a contained policy file or from a policy database) that is to be enforced against LOB executable 713. Hooking dynamic library 707 can prevent data exchanges with LOB executable 713 when the data exchanges do not comply with the accessed policy. In some embodiments, hooking dynamic library 707 can notify user 752 how to comply with an accessed policy, such as, for example, by authenticating, using encryption, checking GPS coordinates of device 751 against a specified geographic area, or checking time data against a specified time window. When indicated by the accessed policy, hooking dynamic library 707 can also disable LOB executable 713.

Figure 8:
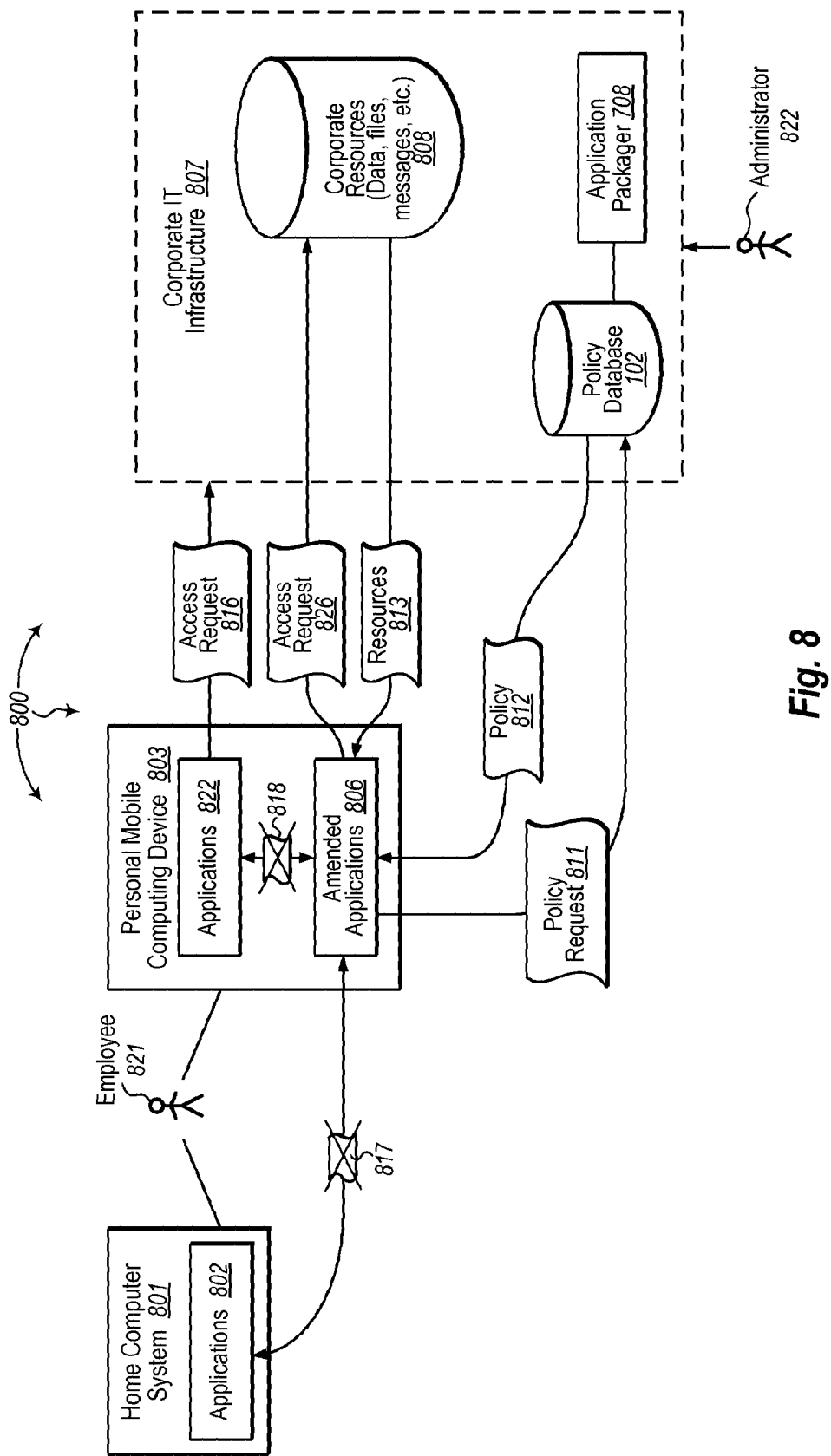
FIG. 8 illustrates a computer architecture with applications operating in a non-cooperative environment.

An amended application (e.g., amended application 722 or amended LOB application 712A) and corresponding policy can be configured within a non-cooperative environment to control what data is exchanged with the amended application. Turning to FIG. 8, FIG. 8 illustrates computer architecture 800 with applications operating in a non-cooperative environment.

As depicted, computer architecture 800 includes home computer system 801, personal mobile computing device 803 (e.g., a mobile phone or tablet), and corporate IT infrastructure 807. Each of home computer system 801, personal mobile computing device 803, and corporate IT infrastructure 807 can be connected to one another over (or be part of) a network, such as, for example, a Local Area Network ("LAN"), a Wide Area Network ("WAN"), and even the Internet. Accordingly, home computer system 801, personal mobile computing device 803, and corporate IT infrastructure 807 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, corporate IT infrastructure 807 includes policy database 102, application packager 708 and corporate resources 808. Administrator 822 can administer the components and data of corporate IT infrastructure 807 on behalf of a corporate entity. As such, administrator 822 can utilize application packager 708 to create amended applications, such as, for example, amended applications 806. Administrator 822 can also update policies associated with amended applications in policy database 102.

Employee 821 can be an employee of the corporate entity. Employee 821 can use different computer systems at different times. For example, employee 821 can use applications 802 of home computer system 801 when at home. Employee 821 can carry personal mobile computing device 803 with them and use personal mobile computing device 803 in various different locations. Although employee 821 has primary control of (and may even own) personal mobile computing device 803, it may be of benefit to the corporate entity to permit employee 821 to access parts of corporate resources 808 through personal mobile computing device 803. It may also be of benefit to employee 821 to access parts of corporate resources through personal mobile computing device 803. However, the corporate entity may also have a desire to prevent (intentional or accidently) dissemination of the corporate resources from personal mobile computing device 803 to other computer systems. Thus, employee 821 may agree to permit the installation of amended applications on personal mobile computing device 803.

For example, administrator 822 can install amended applications 806 on personal mobile computing device 803. During execution of an amended application 806, the amended application 806 can contact policy database 102 to understand what management operations to take, such as, for example, disabling a target application, requiring authorization for employee 821, encrypting files, etc., for a corresponding target application. For example, an amended application 806 can send policy request 811 to policy database 102. Policy database 102 can return policy 812 to the amended application 806. Policy 812 indicates what management operations the amended application 806 is to take for a corresponding target application associated with (e.g., embedded within) the amended application 806.

The amended application 806 can match policy elements of policy 812 to a set of APIs that are to be intercepted (e.g., APIs related to cut and paste operations). During execution of the corresponding target application, the amended application 806 intercepts API requests from the corresponding target application to APIs in the set of APIs. As employee 821 interacts with the corresponding target application, the amended application 806 can modify the behavior of the corresponding target application based on policy 812. In the case of cut and paste, the amended application 806 may deny an API request of the corresponding target application. In other cases, the amended application 806 may require one or more of: the contents of a file to be encrypted, authorization of the corresponding target application, personal mobile computing device 803 being within a specified geographic area, or the current time at personal mobile computing device 803 to be within a specified time window, before employee 821 can proceed.

Corporate IT infrastructure 807 can be configured to block access requests from non-managed applications. For example, corporate IT infrastructure 807 can block access request 816 from an application 802. On the other hand, corporate IT infrastructure 807 can be configured to permit access requests from managed applications that comply with corresponding policy. For example, corporate IT infrastructure 807 can permit access request 826 from an amended application 806 (e.g., an email program). Corporate IT infrastructure 807 can return resources 813 (e.g., corporate email messages) back to the amended application 806.

A returned policy can prevent amended applications and corresponding target applications from exchanging data with other applications. For example, policy 812 can define that amended applications 806 are prevented from exchanging data with other applications. Crossed out data elements 817 and 818 represent that amended applications 806 and their corresponding target applications are prevented from exchanging data with applications 802 and applications 822.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a computer system, the computer system including a processor and system memory, the method for enforcing a policy for an application, the method comprising:
   receiving user input selecting an amended application for execution, the amended application including an embedded target application, the embedded target application embedded within the amended application;
   accessing a policy file specified for the embedded target application, the policy file including one or more policy elements, the one or more policy elements defining one or more management conditions that are to apply to the embedded target application;
   configuring the amended application to monitor the embedded target application's use of one or more Application Program Interfaces (APIs) relevant to the defined one or more management conditions;
   executing the embedded target application subsequent to configuring the amended application to monitor the one or more APIs;
   during execution of the embedded target application, detecting an API request from the embedded target application to an API from among the one or more APIs, the API for performing an activity related to a management condition from among the defined one or more management conditions;
   gathering additional context associated with performing the activity;
   tracking visual state of the embedded target application by storing visual state data for the embedded target application; and
   adjusting behavior of the embedded target application so that the activity complies with the management condition based on the gathered additional context, including:
     determining that the amended application is to present a custom user interface;
     switching visual context to the amended application;
     the amended application injecting the custom user interface into the embedded target application;
     receiving user input at the custom user interface;
     switching visual context to the embedded target application subsequent to receiving the user input; and
     restoring the visual state data for the embedded target application based on the stored visual state data.

2. The method of claim 1, wherein injecting the custom user interface into the embedded target application comprises injecting a custom user interface requesting credentials from a user.

3. The method of claim 1, wherein injecting the custom user interface into the embedded target application comprises injecting a custom user interface that presents a message, the message indicating why the embedded target application is non-compliant with the policy.

4. The method of claim 1, wherein adjusting the behavior of the embedded target application comprises denying performance of the activity.

5. The method of claim 1, wherein adjusting the behavior of the embedded target application comprises preventing the exchange of data from the embedded target application to a less secure destination.

6. The method of claim 5, wherein preventing the exchange of data from the embedded target application to a less secure destination comprises preventing the exchange of data with one of: a clipboard or another application.

7. The method of claim 1, wherein adjusting the behavior of the embedded target application comprises forcing the embedded target application to use encryption.

8. The method of claim 1, wherein adjusting behavior of the embedded target application comprises disabling execution of the embedded target application.

9. The method of claim 1, wherein adjusting behavior of the embedded target application comprises preventing the embedded target application from executing based on determining that that the operating environment at the computer system is not compliant with the policy.

10. The method of claim 1, wherein accessing a policy file specified for the embedded target application comprises accessing a policy file contained in the amended application.

11. A method for use at a computer system, the computer system including a processor and system memory, the method for enforcing a policy for an application, the method comprising:
    receiving user input selecting an amended application for execution, the amended application including an embedded target application, the embedded target application embedded within the amended application;
    accessing a policy file specified for the embedded target application, the policy file including one or more policy elements, the one or more policy elements defining a policy of one or more management conditions that are to apply to the embedded target application;
    configuring the amended application to monitor the target application's use of one or more Application Program Interfaces (APIs) relevant to the defined one or more management conditions;
    attempting to execute the embedded target application subsequent to configuring the amended application to monitor the one or more APIs;
    executing the embedded target application in response to attempting to execute the embedded target application;
    detecting an (API) API request from the embedded target application to an API from among the one or more APIs;
    gathering additional context associated with executing the embedded target application;
    determining that a defined management action, from among the defined one or more management conditions, is not satisfied based on the gathered additional context; and
    subsequent to executing the embedded target application, adjusting behavior of the embedded target application in accordance with the policy in response to detecting the request to the API by preventing the embedded target application from executing based on determining that the defined management action is not satisfied.

12. A system, the system comprising:
    one or more processors;
    system memory coupled to the one or more processors, the system memory storing executable instructions; and
    the one or more processors configured to execute the executable instructions to enforce a policy for an application, including:
        receive user input selecting an amended application for execution, the amended application including an embedded target application, the embedded target application embedded within the amended application;
        access a policy file specified for the embedded target application, the policy file including one or more policy elements, the one or more policy elements defining one or more management conditions that are to apply to the embedded target application;
        configure the amended application to monitor the embedded target application's use of one or more Application Program Interfaces (APIs) relevant to the defined one or more management conditions;
        execute the embedded target application subsequent to configuring the amended application to monitor the one or more APIs;
        during execution of the embedded target application, detect an API request from the embedded target application to an API from among the one or more APIs, the API for performing an activity related to a management condition from among the defined one or more management conditions;
        gather additional context associated with performing the activity;
        track visual state of the embedded target application by storing visual state data for the embedded target application; and
        adjust behavior of the embedded target application so that the activity complies with the management condition based on the gathered additional context, including:
        determine that the amended application is to present a custom user interface;
        switch visual context to the amended application;
        inject the custom user interface into the embedded target application;
        receive user input at the custom user interface;
        switch visual context to the embedded target application subsequent to receiving the user input; and
        restore the visual state data for the embedded target application based on the stored visual state data.

13. The system of claim 12, wherein the one or more processors configured to execute the executable instructions to inject the custom user interface into the embedded target application comprise the one or more processors configured to execute the executable instructions to inject a custom user interface requesting credentials from a user.

14. The system of claim 12, wherein the one or more processors configured to execute the executable instructions to inject the custom user interface into the embedded target application comprises the one or more processors configured to execute the executable instructions to inject a custom user interface that presents a message, the message indicating why the embedded target application is non-compliant with the policy.

15. The system of claim 12, wherein the one or more processors configured to execute the executable instructions to adjust the behavior of the embedded target application comprises the one or more processors configured to execute the executable instructions to deny performance of the activity.

16. The system of claim 12, wherein the one or more processors configured to execute the executable instructions to adjust the behavior of the target application comprises the one or more processors configured to execute the executable instructions to prevent the exchange of data from the embedded target application to a less secure destination.

17. The system of claim 16, wherein the one or more processors configured to execute the executable instructions to prevent the exchange of data from the embedded target application to a less secure destination comprises the one or more processors configured to execute the executable instructions to prevent the exchange of data with one of: a clipboard or another application.

18. The system of claim 12, wherein the one or more processors configured to execute the executable instructions to adjust the behavior of the embedded target application comprises the one or more processors configured to execute the executable instructions to force the embedded target application to use encryption.

19. A system, the system comprising:
one or more processors;
system memory coupled to the one or more processors, the system memory storing executable instructions; and
the one or more processors configured to execute the executable instructions to enforce a policy for an application, including:
receive user input selecting an amended application for execution, the amended application including an embedded target application, the embedded target application embedded within the amended application;
access a policy file specified for the target application, the policy file including one or more policy elements, the one or more policy elements defining a policy of one or more management conditions that are to apply to the embedded target application;
configure the amended application to monitor the embedded target application's use of one or more Application Program Interfaces (APIs) relevant to the defined one or more management conditions;
attempt to execute the embedded target application subsequent to configuring the amended application to monitor the one or more APIs;
execute embedded the target application in response to attempting to execute the embedded target application;
detect an API request from the embedded target application to an API from among the one or more APIs;
gather additional context associated with executing the embedded target application;
determine that a defined management action, from among the defined one or more management conditions, is not satisfied based on the additional context; and
subsequent to executing the embedded target application, adjust the behavior of the embedded target application in accordance with the policy in response to detecting the request to the API by preventing the embedded target application from executing based on determining that the defined management action is not satisfied.

20. The system of claim 19, wherein the one or more processors configured to execute the executable instructions to adjust behavior of the embedded target application comprises the one or more processors configured to execute the executable instructions to disable execution of the embedded target application.

21. The system of claim 19, wherein the one or more processors configured to execute the executable instructions to adjust behavior of the embedded target application comprises the one or more processors configured to execute the executable instructions to prevent the embedded target application from executing based on determining that that the operating environment at the computer system is not compliant with the policy.

22. The system of claim 19, wherein the one or more processors configured to execute the executable instructions to access a policy file specified for the embedded target application comprise the one or more processors configured to execute the executable instructions to access a policy file contained in the amended application.

* * * * *